March 10, 1964
R. PELLETIER
3,124,665
NON-ARCING ELECTRICAL SWITCH
Filed May 25, 1962
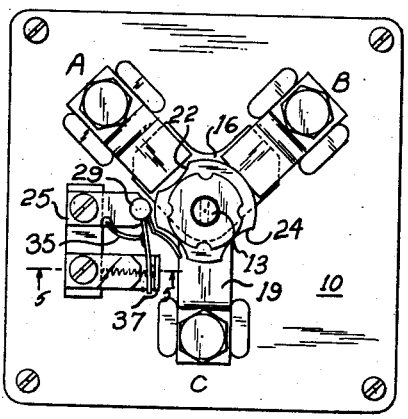
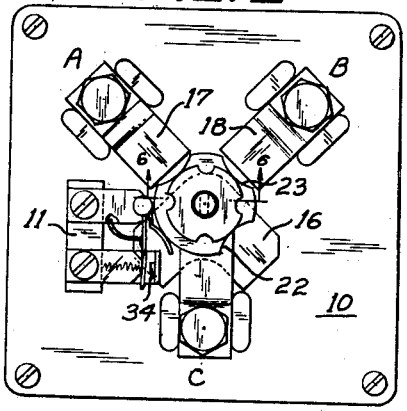
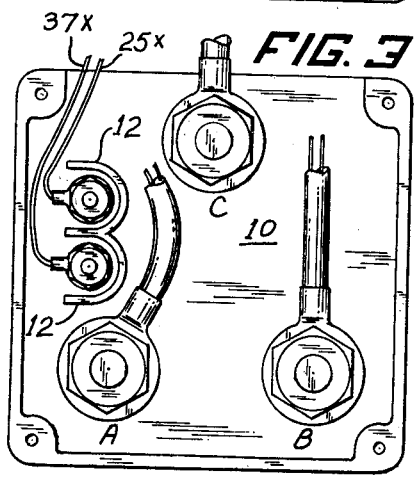
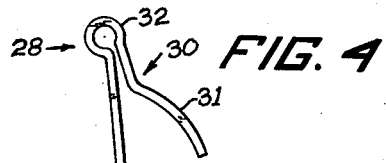
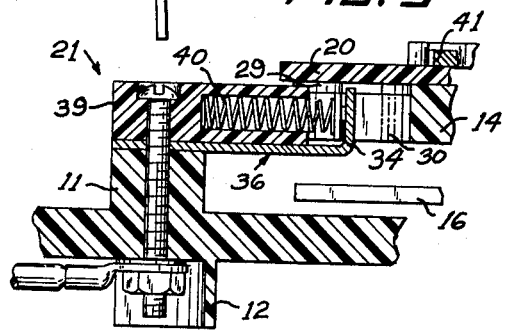
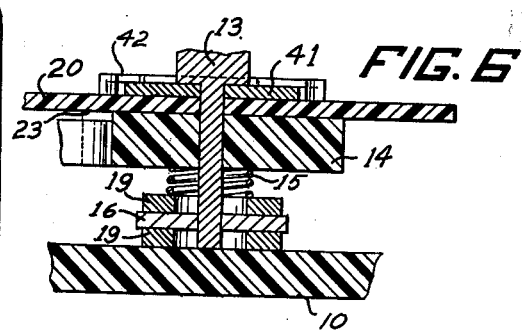
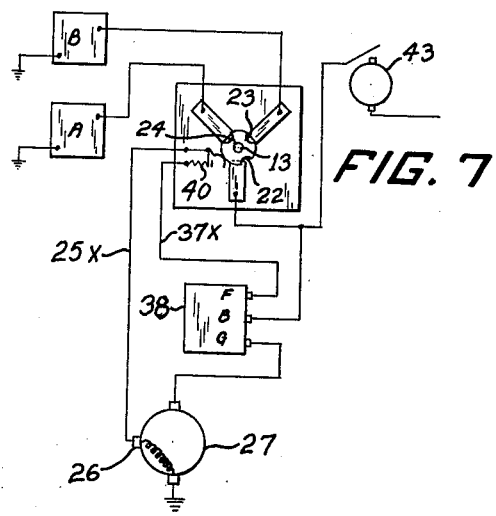

United States Patent Office 3,124,665
Patented Mar. 10, 1964

3,124,665
NON-ARCING ELECTRICAL SWITCH
Roger Pelletier, 2560 Ocean Ave., Seaford, N.Y.
Filed May 25, 1962, Ser. No. 197,799
2 Claims. (Cl. 200—10)

This invention relates to an improvement of the switch shown in United States Patent No. 2,947,826.

The switch of the patent exhibits some arcing or sparking upon switching between terminal points. The improvement of this invention substantially eliminates this arcing. Thus, in this invention, while the switch blades are being rotated, the field circuit of the generator is maintained in an open position. And it is only after the rotation procedure and terminal contacts are completed that the field circuit is closed.

Also when the switch is turned off, the field circuit is automatically opened and stays open until contact is made, as desired, selectively with one or the other or both of the batteries to be charged.

According to this invention, the field circuit is maintained in its open position while the battery switch still engages one or both battery leads thereby permitting the voltage surge to be directed into the selected battery or batteries instead of producing sparking at the contact points.

In other words, the generator or alternator, when one is used in lieu of a generator, is effecting a charging function only when good contact with the batteries is present.

The advantage of this improved invention is therefor in effect the opening of any or all circuits on, for example a boat, at the battery without harm to the generator or alternator and voltage regulator.

There is also extra safety in the event the reverse current relay should stick. Moreover, this invention prevents the generator from supplying ignition power when the switch is open.

This switch invention is especially important for protecting voltage regulators when the generator is being driven and the switch is in open position.

In modern practice, alternators are often used in place of the former conventionally used generators. Modern alternators on power boats generate about 55 amperes of current at 12 volts. With such alternators supplying current to the boat facilities, it is important to open the alternator field current properly because the maximum feed current into the batteries is only 3.75 amperes at 15 volts.

This invention is described by means of an illustrative embodiment shown in the accompanying drawing and in which;

FIG. 1 is a top plan view of the base of the switch showing the V-shaped switch blade contacting the positive terminals of two batteries A and B as well as the switch outlet terminal C and showing the field circuit switch in closed position, FIG. 2 is a top plan view of the switch showing the V-shaped switch blade in open position, that is with the batteries being out of contact with the outlet terminal C and showing the field circuit switch also in open position, FIG. 3 is a bottom view of the improved switch, FIG. 4 is a top plan view of the contact spring used in the field circuit switch, FIG. 5 is a section view taken substantially on line 5—5 of FIG. 1, FIG. 6 is a section view taken substanially on line 6—6 of FIG. 2, and FIG. 7 is a schematic electrical wiring diagram showing the manner of using the field circuit switch in conjunction with a conventional generator and voltage regulator.

Turning to the drawing the base 10 switch is a modification of the base shown in United States Patent 2,947,826 in that an integral stud 11 is provided in the top surface of base for the automatic field switch, and therebelow an integral curved shield wall 12 is provided for the terminal contacts of said field switch, disposed in the bottom surface of said base (FIG. 5).

The drive shaft 13 of this invention is substantially the same as that shown in the said patent. However, in this invention an insulator cam 14, made of plastic or other electrical insulating material, is disposed on the contact spring 15.

A substantially V-shaped contact switch blade 16 is provided with a linear slot and the linear end of shaft 13 is lockingly disposed therein so that turning of shaft 13, turns the blade 16 therewith.

The three pairs of contact shoes are each suitably bent and spaced-apart to receive the rotatable blade 16. Two pairs of contact shoes 17 and 18 lead to terminals of separate batteries A and B. The current outlet pair of contact shoes 19 are longer than the shoes 17 and 18. The contact shoes 19 are each provided with a suitable round aperture to receive the linear end of shaft 13. Thus shoes 19 also function to hold the depending end of shaft 13 (FIG. 6).

A shield plate 20 of electrical insulating plastic material is disposed lockedly on the linear end of shaft 13 above the plastic cam 14.

The shield plate 20 and the cam 14 may be made and preferably is of unitary or one piece construction.

An important feature of this invention is the provision of an automatically operated field circuit switch 21 disposed in the field circuit of the conventional generator used to re-charge the batteries.

The field circuit is automatically interrupted or broken in a pre-determined manner as set by the cam 14 to prevent undesirable arcing at the switch contacts among other advantages. To effect these desired results, the cam 14 is provided with three suitably curved indentations 22, 23 and 24.

The switch 21 comprises a flat metal bar 25 secured at one end to a field circuit terminal that leads to wire 25X which leads to the field circuit contact 26 on the generator 27. An upright headed metal pin 29 is press fitted into a suitable aperture in the other end of bar 25 and a suitable two prong metal spring 28 is captively held by said pin 29. The spring 28 consists of a curved leg 30 having a smooth curved portion 31 to engage the rim of the cam wheel 14. Leg 30 is integral with a substantially circular portion 32 adapted to engage the shank of pin 29 and portion 32 is integral with a contact substantially straight leg 33 which engages and disengages with a contact point 34 in said field circuit.

Preferably, but optionally, a wire 35 is soldered to bar 25 and spring leg 33 to effect excellent electrical contact between these elements.

As shown in FIG. 5, a metal bar 36 is provided with an integral right angular end piece 37 to which contact point 34 is fused. The flat end of bar 36 is secured to the field circuit terminal and wire 37X to the voltage regulator 38.

The field switch 21 is also provided with a plastic holder 39 having a suitable linear well cavity therein in which there is disposed a coil spring 40. Spring 40 continuously engages leg 33 of the metal contact spring 30 urging it toward contact point 34.

An index cam 41 is disposed lockingly on the linear end of the shaft 13. The index spring 42, as shown in the patent cited above, engages the index cam 41 in preselected locked positions, as for example, when the most advantageous contact is made between a battery A or B and the outlet terminal C. As shown in FIG. 7, terminal C leads to the voltage regulator 38 and starter 43 and to other utilities on the boat as for example, lighting, radio, etc. The indicia F, B and G on all conventional voltage regulators signify "field," "battery" and "generator" contacts thereon and appear on the voltage regulator 38 herein.

The contact spring 30 may be variously made and therefore is not limited to being all metal nor of the configuration shown in the drawing.

As shown in the drawing cam 14 is provided with three curved recesses 22, 23 and 24. With this specific cam both the A and B battery may be charged at the same time. However, cam 14 may be provided with only two opposed recesses, in which case the A or the B battery may be charged separately, but not both batteries simultaneously. Clearly cam 14 may be provided with selective recesses depending on the number of batteries, two or more, being used and the desirable manner of charging these batteries.

This invention is of broad scope and therefore not to be limited to its illustrations.

I claim:

1. In an electrical marine switch having a centrally disposed conventional V-shaped hand operated rotatable blade for selective engagement of one or more batteries and having a molded insulator base engaging said blade, the substantially non-sparking improvement comprising a suitably rim notched insulator circular cam keyed to said blade; a first metal contact means having a pin fixed thereto secured to said base; a second metal L-shaped contact means secured to said base; a two prong metal contact spring disposed at its apex about said pin, one leg of which is a curved leg continuously engaging the rim of said cam and the other being a straight leg disposed adjacent to said L-shaped contact means for suitable break and make contact therewith respective to the notches on said rotatable cam.

2. The switch of claim 1 comprising coil spring means disposed adjacent said metal L-shaped contact means engaging continuously said straight leg of said two prong metal spring and urging it toward said L-shaped metal to effect contact therewith when said curved leg falls within a rim notch of said cam.

References Cited in the file of this patent

UNITED STATES PATENTS

| 2,892,906 | Medlar | June 30, 1959 |
| 2,947,826 | Pelletier | Aug. 2, 1960 |